United States Patent [19]

Lapeyre

[11] 3,818,703
[45] June 25, 1974

[54] WAVE ENERGY CONVERTER ARRAY

[75] Inventor: James M. Lapeyre, New Orleans, La.

[73] Assignee: The Laitram Corporation, New Orleans, La.

[22] Filed: June 25, 1973

[21] Appl. No.: 373,443

Related U.S. Application Data

[63] Continuation-in-part of Ser. No. 148,775, June 1, 1971, abandoned.

[52] U.S. Cl. .................................................. 60/504
[51] Int. Cl. ................................................ F03c 5/02
[58] Field of Search ............................. 60/496–506

[56] References Cited
UNITED STATES PATENTS

| | | | |
|---|---|---|---|
| 1,026,450 | 5/1912 | Neal | 60/504 |
| 1,408,094 | 2/1922 | Kersey | 60/500 |

FOREIGN PATENTS OR APPLICATIONS

| | | | |
|---|---|---|---|
| 564,314 | 12/1923 | France | 60/504 |
| 639,766 | 6/1928 | France | 60/507 |

Primary Examiner—Edgar W. Geoghegan
Assistant Examiner—H. Burks, Jr.
Attorney, Agent, or Firm—Schiller & Pandiscio

[57] ABSTRACT

Apparatus for converting the energy of surface waves in a liquid such as an ocean, comprising an array of buoyant helical members each mounted for rotation about an axis. The pitch of the helical members equals or is greater than the length of the expected waves and the members are floated on the surface with their axes oriented so that wave length of the waves matches the pitch of the helices times the cosine of the angle between the helical axes and the direction of wave propagation. In one embodiment the array is a large chevron formed of two groups of helical members and is pivotable about the apex of the chevron. In another embodiment the helical members are arranged in zig-zag fashion. Means are provided for adjusting the angles between the arms of the chevron in the one case, and the adjacent arms of the zig-zag in the other case.

15 Claims, 5 Drawing Figures

PATENTED JUN25 1974 3,818,703

WAVE ENERGY CONVERTER ARRAY

This application is a continuation-in-part of U.S. application Ser. No. 148,775, filed June 1, 1971, now abandoned.

The present invention is concerned with conversion of the energy of ocean waves into useful power and particularly to apparatus adapted to be rotated by ocean waves.

That a tremendous and inexhaustable source of energy is to be found in wind-driven ocean waves is well known and innumerable attempts have been made to convert this energy to a useful form. It has been found that in many sections of the world such as, for example, the west coast of North America, waves approach the coast with great regularity and without interruption over extended periods of time. This has suggested that it might be economically feasible to construct apparatus for converting the available wave energy to a more useful form such as electricity. Waves in water may be termed "gravity waves" and while the waves move horizontally at substantial speeds; e.g., thirty knots, the motion of the water itself is essentially circular or elliptical, except when the wave is caused to break. Wave energy conversion systems employed heretofore have utilized the vertical component of the water motion and/or water movement associated with breaking waves. Such systems are intermittent in their operation and/or have variable energy outputs, while the tremendous wave forces involved, particularly those encountered during storms or as a result of seismic disturbances, have necessitated very substantial and expensive structures.

Another characteristic of ocean waves is their period or wavelength which, over extended periods of time, may, in many locations, deviate only slightly from a particular value.

Ordinarily however, direction of wave travel, and wave amplitude, period and length are not nearly constant. For example, on a typical location in the North Atlantic Ocean an average wave may have an amplitude of 3 feet, a period of 7 seconds, and a length of about 260 feet. The frequency of occurance of waves exhibiting these values will vary extensively, and somewhat seasonably. For example, during the winter season the frequency of occurance of a wave as above described may be about 30 percent, while in the summer season, the frequency of occurance is only about 9 percent.

It is therefore a primary object of the present invention to provide a wave energy converter adapted to operate continuously and provide a continuous energy output, despite long term variations in the period and direction of the waves. This is achieved by virtue of a novel and improved structure that efficiently utilizes energy of motion of gravity waves.

Other objects of the invention are: to provide a wave energy converter as described that it relatively simple and inexpensive; to provide apparatus as described adapted to directly convert wave energy into torque; and to provide a wave energy converter that is adjustable for changes in the direction of wave travel and/or the period of waves.

To effect the foregoing and other objects, the present invention generally comprises an array of a plurality of buoyant helical members mounted for rotation about their respective helical axes and adapted to be positioned such that the helical axes are oriented with respect to the mean direction of propagation of the waves in a manner intended to optimize the coupling between the waves and the helices. The helical members can be coupled to one or more driven systems, such as electrical generators, friction boilers or the like.

Other objects of the invention will, in part, be obvious and will, in part, appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be made to the following detailed description taken in connection with the accompanying drawings wherein.

Figure 1:
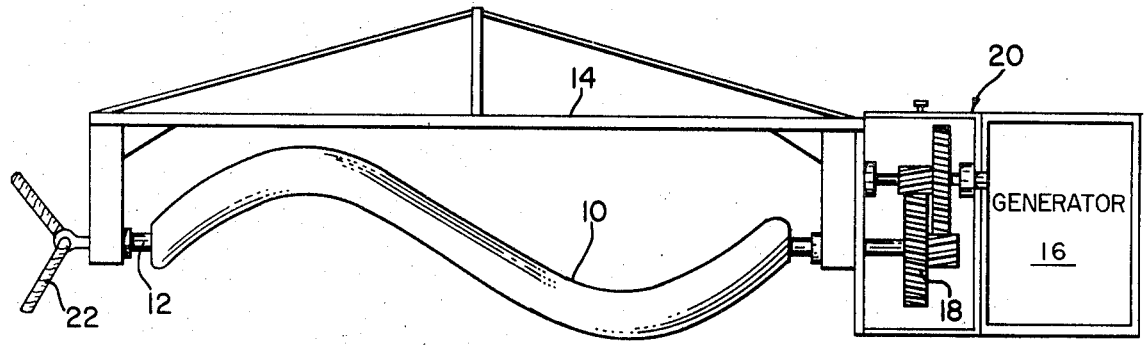
FIG. 1 is a somewhat schematic, elevational view, partially in section, and partially in perspective, illustrating a single wave energy converter embodying the invention.

The wave energy converter of the invention is shown in FIG. 1 as comprising means adapted to be rotated directly by ocean waves and power conversion means such as an electrical generator, coupled with the wave rotated means and adapted to be driven thereby. The rotary, wave-driven means include an elongated buoyant member 10 in the form of a helix mounted for rotation about the axis of the helix. Buoyant helical member 10 is constructed so as to displace only a small portion of its volume and may comprise, for example, a tube or it may be formed of a material such as one of the expanded polymers, having a relatively low specific gravity. Member 10 may be self-supporting and rotatably mounted at its ends as shown in FIG. 1 or the helical member, designated 11 in FIG. 2 may be coiled around a supporting shaft 12 and supported at regular intervals throughout its length.

As previously noted, over extended periods of time, the waves in certain locations of the oceans may be characterized by a substantially constant period and direction of propagation. If the period is known or can be predicted accurately, then the wave length and wave velocity are readily computed, being functions of the wave period. For example, it is not unusual to encounter waves having a period of ten seconds which means that the waves travel at a velocity of about thirty knots or fifty feet per second and have a length of the order of five hundred feet. The helical buoyant member 10 is designed to float on the surface of the water while oriented with its helical axis in the direction of wave propagation such that each wave traverses the helical member from end to end buoyantly supporting successive sections of the helical member.

Figure 3A:
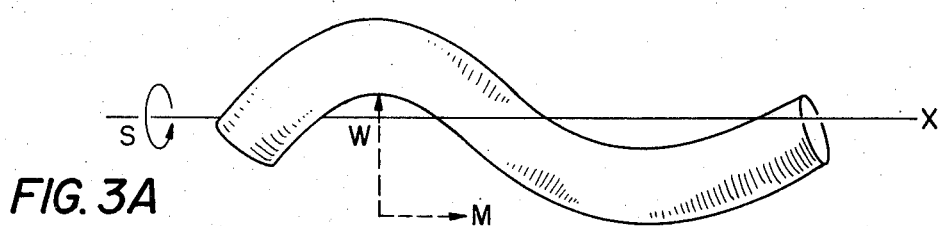
FIG. 3 is a series of views illustrating operation of a buoyant helix of the invention.
Figure 3B:
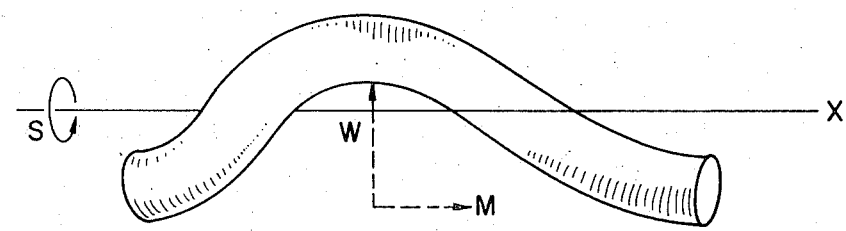
Figure 3C:
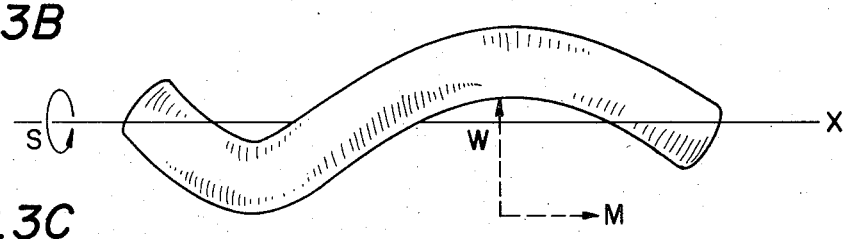

In FIG. 3, there are three successive idealized views A, B, and C, of a helix rotated about an axis X by a wave according to the present invention. In each view, the position of the wave crest is indicated by the broken arrow marked W, the direction of wave propagation is indicated by the broken arrow marked M, and the direction of shaft rotation is indicated by the arrow marked S. It should be noted that as the wave crest progresses from left to right successively from the position shown in view A, to that shown in view B, to finally that shown in view C, the motion of the wave along M raises successive portions of the helical member, causing it to rotate about axis X.

In the preferred embodiment of the apparatus of the invention, the pitch (length of a 360° section) of the helix will be at least approximately equal to the length of the expected waves and will be at least 360° in length. By virtue of this construction, rotation of the helical member will be continuous since a wave will start to transverse the helix immediately as the preceding wave has finished transversing the helix and successive waves will act on sections of the helix immediately as the preceding wave has finished transversing the helix and successive waves will act on sections of the helix spaced 360° apart (the pitch length) so that the two lifting forces, converted into torque by the helical member, act simultaneously and in the same direction.

Figure 2:
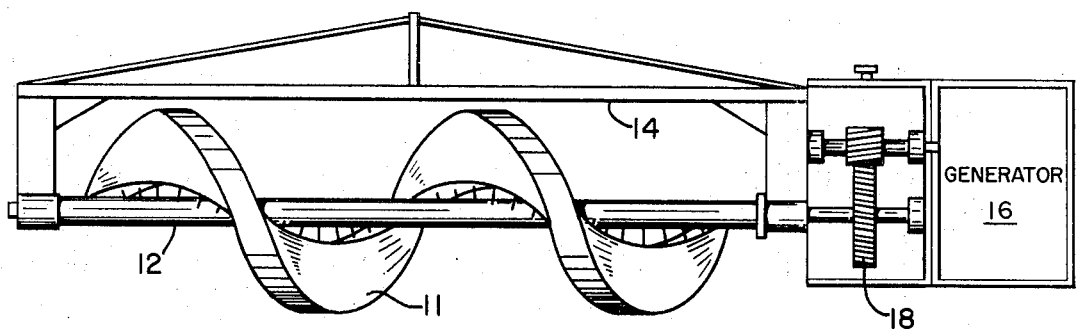
FIG. 2 shows another embodiment of a buoyant helix adapted for incorporation in the apparatus of the invention.

The buoyant helical member may have any convenient cross-section such as circular as shown in FIG. 1, or rectangular as shown in FIG. 2. However, it is important that the helical member have a substantially uniform cross section or buoyancy, throughout at least 360° of its length so that the torsional component of the force exerted on the helix by each wave remains substantially constant as the wave traverses the helix. In this way, rotation of the helical member will be at substantially constant speed as well as continuous, thus making the apparatus more ideally suited for driving means, such as an electrical generator, required to be driven continuously and at constant speed. The end sections of the helical member may be rounded or tapered to promote smoother flow of the waves as they start and finish traversing the helix.

The other components of the apparatus include means for mounting the helical member for rotation about its axis. These means include a frame or supporting truss 14 in which are journaled shafts 12 extending from the ends of helical member 10, as shown in FIG. 1, or shaft 12 (shown in FIG. 2) on which helical member 111 is supported.

In an alternative embodiment (not shown), the supporting truss may be eliminated and the helical member mounted for rotation at only one end. For maximum coupling of the helical member to the surface waves, the buoyancy of the helix should be adjusted (be selection of materials, structural weighting or the like) so that in a calm sea, the helical member floats with one-half above water and the other half submerged, the helical axis thus lying in the plane of the water surface. With such a structure, the helical axis will remain near water level for waves of substantial amplitude. If the helical member were either so light that it rode almost completely on the wave crests or so heavy that it were neutrally buoyant and rode completely submerged just below the wave crests, it will be seen that no torque will be produced. The fifty percent buoyant condition is half way between these extremes and gives maximum torque and power output.

The driven energy conversion components of the wave energy converter include, for example, a conventional electrical generator 16 coupled with the helix through a suitable transmission including, for example, speed-up gears 18. The generator and gears or other rotary driven means are mounted and enclosed in a water-tight, buoyant housing 20 coupled with supporting truss 14 or adapted itself, to function as a support for one end of the helical member. Thus, the helical member, the supporting truss and the driven power generator, may be constructed as a buoyant unit that can be moved through the water as any vessel. This permits the converter to be positioned in the most favorable location, oriented as required with respect to the direction of wave travel and moved to a safe place to avoid damage in the event of a storm or other disturbance. It will be appreciated that the wave energy need not be converted into electrical energy, but can be converted to other energy forms and, indeed, put to immediate use.

The device of the invention may serve in other capacities connected with the marine environment. For example, instead of driving a heat transducer, it can be coupled to drive an impellerless centrifugal type of pump which could be used to entrap fish and drive them into a mesh storage chamber. In such case, an auxiliary pump could be used to macerate a minor proportion of the pumped fish to provide sustenance for the remainder.

When the pitch of the helical member matches the wave length, optimum coupling between the helical member and wave is achieved by positioning the helical member with its axis parallel with the direction of wave travel. This can be accomplished by providing conventional moorings and securing the converter to the moorings by means such as lines 22. The converter may be oriented with either end located toward the source of the waves while housing 20 may be constructed so as to provide minimum interference with wave travel particularly when located toward the source of the waves as would be the case when the housing itself functions as the support for one end of the helical member. Additionally, housing 20 may be provided with suitable ballast, a keel or the like, to prevent axial rotation (capsizing) of the housing and/or to assist in predeterminedly orienting the converter with respect to the direction of the wave travel.

While the wave converter shown and described is designed to float as a unit on the surface, other embodiments including fixed components are considered to fall within the scope of the invention. For example, the supporting truss 14 and/or the housing 20 for the driven power (torque) converter may be buoyed or supported independently of the helical member so that the latter is suspended at its ends at the proper height with respect to the water surface. In embodiments of this type, the supporting truss 14 and/or housing 20 may be mounted so as to be movable only vertically as required to compensate for tide changes. For example, the helical member and/or driven power converter can be mounted on fixed structures mounted on the sea floor and providing for raising and lowering of the helical member as required to position it with a section immersed in the water, or remove it from the water to avoid storm damage.

However, because as earlier noted, the wave length of gravity waves at a given locale are usually not a long term constant, it is preferred to provide the helical member with a pitch greater than the longest reasonably expected wave length at a proposed locale of use. This helical member of pitch L, of then held at an angle $\theta$ with respect to the direction of propagation of waves of wavelength $\lambda$ such that $L \cos \theta = \lambda$, will be optimally coupled to those waves, i.e. the wave length and pitch will be matched.

Because one can incline the helix to the direction of wave propagation, an array of a plurality of wave converters can be formed which will provide several advantages. Before discussing such arrays, a brief dissertation on the operation of the helical member may be useful.

The torque produced by a helix of arbitrary cross-sectional shape can be considered the sum of the torques produced by a large number of elementary helices of very small cross-section. It can be shown that the maximum power output P from such a helix is the product of the torque per unit length, the angular velocity W and the length or pitch L of the helix. Then for a wave of period T and wavelength $\lambda$ to which L is matched, and a helix of semicircular cross-section:

$$P (2g\rho a^3 \lambda/T) F \quad (1)$$

$g$ being the acceleration of gravity, $\rho$ the density of the water, $a$ the amplitude of the wave and F being a coupling factor which is a function of the ratio of the helix radius R to $a$.

It can be shown that as the value of $R/a$ increases, the coupling factor increases tremendously. For example, the following are some exemplary values of $R/a$ and F:

| R/a | F |
|-----|-------|
| 0.5 | 0.089 |
| 1.0 | 0.684 |
| 2.0 | 3.726 |
| 3.0 | 8.759 |
| 4.0 | 15.803 |

This foregoing table shows that for a given wave amplitude the power output increases dramatically with the radius of the helix owing to better coupling.

If one now employs a helix of length greater than the largest reasonably expected wavelength $\lambda$ at a given locale in order to express the maximum power Pn that the inclined helix can deliver to an optimum load (neglecting damping of the wave as it crosses the helix), one need only insert a $\sin \theta$ term in the denominator of equation (1), i.e.

$$P (2g\rho a^3 \lambda/T \sin \theta) F \quad (2)$$

The available wave power Pw impinging on the inclined helix can be shown to be $$Pw (g\rho a^2 \theta/4T) \cdot (\lambda/\tan \theta) \quad (3)$$

where $\tan \theta$ is the length of the helix projected onto the wavefront.

The actual power extracted by the helix is approximately the smaller of the two values computed by equations (2) and (3). If the value of equation (3) is much larger than the value of equation (2), the wave will not be appreciably attenuated in passing the helix. If the values are reversed, the power extracted will be expressed by equation (3) and thus the wave will be considerably attenuated.

For a wave amplitude of ten feet it can be shown that a helical radius of about thirteen feet will provide a coupling factor of about 1.4 and if one computes the ratio Pn/Pw it will be about 0.39. For the same wave amplitude, and a helical radius of about sixteen and a half feet, the coupling factor becomes 2.36 and the computed ratio Pn/Pw becomes 0.66. By increasing the helical radius to about twenty-six feet, the coupling factor becomes 6.84 and the ratio Pn/Pw becomes 1.91. Where the ratio Pn/Pw is greater than unity, it will be apparent that the attenuation of the wave is substantially complete.

Figure 4:
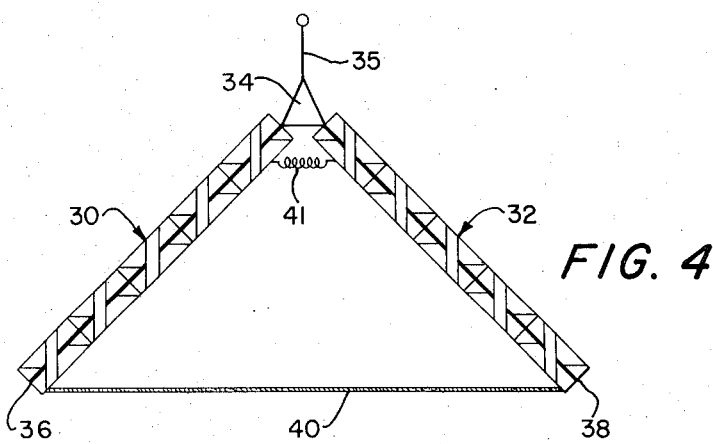
FIG. 4 is a diagrammatic illustration of one form of an array employing wave energy converters of the type shown in FIGS. 1 and 2.

Referring now to FIG. 4, there will be seen one form of array of the helical members of the invention, such as those of FIGS. 1 and 2, assembled to take advantage of the attenuating effect of helices of appropriate radius and to extract large quantities of power from the waves. As shown, a first plurality 30 of helices are provided, all preferably of substantially the same pitch and all disposed coaxially. The pitch of the helices of plurality 30 is preferably greater than the wavelength of the largest reasonably expected waves for the locale at which plurality 30 is to be placed. A second plurality 32 of the same helices is also provided, the helices of plurality 32 all being disposed coaxially. Reapective ends of the coaxial chains of pluralities 30 and 32 are coupled together at apex or hinge 34. The latter is preferably anchored or moored by mooring 35 so that it remains at a substantially fixed point with respect to the ocean bottom, but also so that the entire assembly can pivot about apex 34 to face into the direction of wave propagation. Thus, if the two pluralities are joined at an angle of less than 180°, the entire assemble will tend (ignoring wind effect on freeboard) to "weathercock" or pivot about the mooring of hinge 34 to face into the waves responsively to wave action. If the two pluralities are identical, the bisector of the angle between them will then become substantially perpendicular to the wavefronts.

Means are provided for adjusting the angle formed between the two pluralities of coaxial buoyant helices. To this end, the opposite ends 36 and 38 of pluralities 30 and 32 may be temporarilly moored at desired positions, or held in location by known position-keeping devices such as jets or motor-driven propellors, of the two ends may be tethered to one another by an adjustable length cable 40 where the arms of the chevron are normally biased apart as by spring mechanism 41.

Of course, if the assembly of FIG. 4 is employed in an area where the wave direction and wavelength are both substantially constant, hinge 34 and ends 36 and 38 can all be permanently moored. and 38

Figure 5:
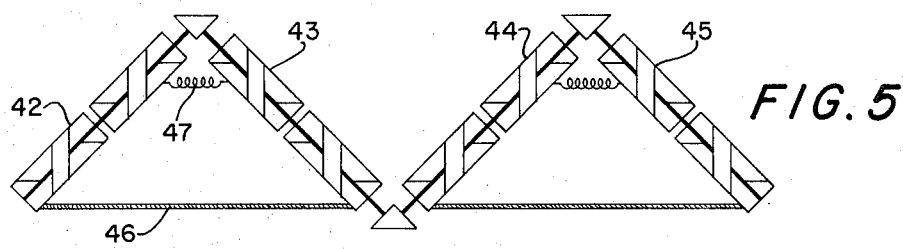
FIG. 5 is a diagrammatic illustration of yet another form of array of wave energy converters.

In an alternative embodiment such as is shown in FIG. 5, a plurality of helices are connected to one another to form a zig-zag array having several legs, 42, 43, 44, and 45, each leg of the zig-zag array containing substantially the same number of one or more helical buoyant members coaxially arranged. Means shown generally at 46 and 47 and which typically are similar to those described in connection with FIG. 4, provide optimum coupling between the wavelength of the waves and the pitch of the individual helices. Appropriate means (not shown) are provided for mooring the array of FIG. 5.

In either of the embodiments of FIGS. 4 and 5 it is desirable that the array be symmetrical. Hence, in the embodiment of FIG. 4 both arms of the chevron array preferably contain substantially the same number of buoyant members and those buoyant members all have helices which are preferably substantially identical in radius, curvature and pitch.

It will be apparent from the foregoing description that the array of wave energy converters of the invention may never be required to withstand the full force of waves as in the case of wave energy converters which cause waves to break, utilize the energy of breaking waves or are located in the region of breaking waves. For this reason and as a result of its mobility, the construction is relatively light and inexpensive as compared with structures which are immobile and, as a result, are subjected to and are designed to withstand severe wave conditions. Also, the area behind an array having buoyant members, of large enough helical radius compared to the wave amplitude should be considerably calmer than the oncoming sea because of the attenuation of wave energy provided by the array. Hence, such arrays could provide comparatively safe harbors.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for converting the energy of surface waves in a liquid, said apparatus comprising, in combination, an array of a plurality of elongated buoyant members, each curved about an axis to form a helix, means mounting each of said buoyant members for rotation about its helical axis and including means for suspending each said member so as to enable it to float partially submerged with respect to the mean level of said liquid, said buoyant members being couplable to means to be driven in response to rotation of said members, and means for orienting the axis of each of said members in a predetermined direction with respect to the direction of propagation of said waves so that the product of the pitch of each said helix times the cosine of the angle between the axis of said each helix and said direction of propagation can approximately equal the wavelength of said waves.

2. Apparatus as defined in claim 1 wherein each said helix formed by said buoyant member includes at least a 360° section.

3. Apparatus as defined in claim 1 wherein the pitch of each said helix is equal to or greater than the wavelength of said surface waves.

4. Apparatus as defined in claim 1 wherein said means for orienting the axis of each of said members is, at least in part, responsive to wave action of said waves.

5. Apparatus as defined in claim 1 wherein at least a first group of said plurality of buoyant members is disposed with the helical axes of said first group being substantially coaxial with one another, and wherein at least another group of said plurality of buoyant members is disposed with the helical axes of said another group being substantially coaxial with one another.

6. Apparatus as defined in claim 5 wherein all of said plurality of buoyant members are divided between said two groups, and the axes of said two groups are joined to one another at one point.

7. Apparatus as defined on claim 6 including means for mooring said apparatus so that it is pivotable about said point.

8. Apparatus as defined in claim 6 including means for varying the angle between the axes of said two groups.

9. Apparatus as defined on claim 6 wherein each of said groups contains approximately the same number of members.

10. Apparatus as defined in claim 5 wherein substantially all of the helices of said members have the same pitch.

11. Apparatus as defined in claim 5 including additional groups of said plurality of buoyant members each of said additional groups being disposed with the helical axes of said members of the group being substantially coaxial with one another, all of said groups being connected so as to form a zig-zag line.

12. Apparatus as defined in claim 11 wherein each of said groups contains substantially the same number of buoyant members.

13. Apparatus as defined in claim 11 including means for varying the angle between the axes of each adjacent pair of groups.

14. Apparatus as defined in claim 1 wherein said buoyant members are connected to one another so as to form a zig-zag line.

15. Apparatus as defined in claim 1 wherein the radii of said helices are larger than the amplitude of said surface waves.

* * * * *